(12) United States Patent
Eikebrokk

(10) Patent No.: US 8,677,676 B2
(45) Date of Patent: Mar. 25, 2014

(54) FISHING TOOL OF THE HOOK-TYPE

(75) Inventor: Tom Roar Eikebrokk, Kristiansand (NO)

(73) Assignee: Innofish AS, Grimstad (NO)

( * ) Notice: Subject to any disclaimer, the term of this patent is extended or adjusted under 35 U.S.C. 154(b) by 0 days.

(21) Appl. No.: 13/519,035

(22) PCT Filed: Jan. 27, 2011

(86) PCT No.: PCT/NO2011/000031
§ 371 (c)(1),
(2), (4) Date: Aug. 3, 2012

(87) PCT Pub. No.: WO2011/093719
PCT Pub. Date: Aug. 4, 2011

(65) Prior Publication Data
US 2012/0285071 A1    Nov. 15, 2012

(30) Foreign Application Priority Data

Jan. 29, 2010  (NO) .................................. 20100142

(51) Int. Cl.
*A01K 85/01*  (2006.01)
*A01K 85/02*  (2006.01)

(52) U.S. Cl.
USPC ............................................... 43/35; 43/26.2

(58) Field of Classification Search
USPC ............................................... 43/26.2, 34–37
See application file for complete search history.

(56) References Cited

U.S. PATENT DOCUMENTS

| | | | |
|---|---|---|---|
| 726,021 A * | 4/1903 | Bryan | 43/26.2 |
| 1,354,952 A | 10/1920 | Bullock | |
| 1,467,750 A * | 9/1923 | Borg | 43/35 |
| 1,609,151 A * | 11/1926 | Bruenig | 43/35 |
| 1,615,747 A * | 1/1927 | Fenner | 43/35 |
| 2,439,391 A * | 4/1948 | Jobson | 43/35 |
| 3,059,371 A | 10/1962 | Haynie | |
| 3,218,749 A | 11/1965 | Dow | |
| 3,266,185 A * | 8/1966 | Abramson, Jr. | 43/35 |
| 3,802,114 A * | 4/1974 | Diebold | 43/37 |
| 3,841,012 A * | 10/1974 | Maled | 43/26.2 |
| 4,176,489 A | 12/1979 | Levstik | |
| 4,536,985 A * | 8/1985 | Caviness | 43/17.6 |
| 4,760,665 A | 8/1988 | Stueber | |
| 5,511,335 A * | 4/1996 | Langer | 43/4 |
| 5,822,911 A | 10/1998 | Cox | |
| 2007/0180756 A1* | 8/2007 | McHone | 43/26.2 |
| 2009/0265975 A1* | 10/2009 | Gibson | 43/42.39 |

FOREIGN PATENT DOCUMENTS

WO    WO2004021775 A1    3/2004

* cited by examiner

*Primary Examiner* — David Parsley
(74) *Attorney, Agent, or Firm* — GableGotwals

(57) ABSTRACT

A fish lure is provided with one or more fishing hook(s) and an attachment for a fishing line, the fishing hook(s) being arranged in a body and being connected to an actuator, a hook-shaped end portion of the fishing hook(s) being arranged to be moved between a first position, substantially enveloped in the body, and a second position, projecting from the body.

10 Claims, 2 Drawing Sheets

FISHING TOOL OF THE HOOK-TYPE

CROSS-REFERENCE TO RELATED APPLICATIONS

This application is the United States National Phase of PCT Patent Application No. NO2011/000031 filed 27 Jan. 2011, which claims priority to Norwegian Patent Application No. 20100142 filed 29 Jan. 2010, which are incorporated herein by reference.

BACKGROUND OF THE INVENTION

A fish lure provided with one or more fishing hooks and an attachment for a fishing line is described, more particularly by the fishing hook(s) being arranged in a body and being connected to an actuator, a hook-shaped end portion of the fishing hook(s) being arranged to be moved between a first position, substantially enveloped in the body, and a second position, projecting from the body.

When fishing with a line and a lure, for example bait or a prey imitation in the form of a spoon or the like, the use of an ordinary fishing hook with barbs involves some disadvantages. The hook may catch on foreign bodies or vegetation in the water and fish that fall off may get injuries inflicted on them by the hook, which may create gateways to infections and pathogenic organisms. The fact that angling of the so-called "catch and release" type, in which the catch is released again, is gaining ground increases the drawbacks inflicted on the fish stocks by the use of ordinary fishing hooks.

The invention has for its object to remedy or reduce at least one of the drawbacks of the prior art, or at least provide a useful alternative to the prior art.

The object is achieved through features which are specified in the description below and in the claims that follow.

The invention is inspired by the gaining of ground of and the interest in "catch and release" fishing. A hook-type fishing tool has been provided that offers better user control during fishing, greater return on the fishing as a consequence of greater catching efficiency and less risk of the fishing tool catching on objects or vegetation in the water, and less risk of the fish becoming seriously injured by the fishing hook that is being used.

Improved user control in angling has always been of interest from an angler's point of view. The angler combines knowledge, experience and improved technical solutions and equipment. Today, the angler has a wide range of equipment available to tailor the equipment to varying, natural conditions as well as to the angler's preferred solutions. The present invention carries the development a considerable step forward by providing user-controlled or automatic hooking.

In a lure for fish a sensor system is arranged, sensing a tension increase on a fishing line connected to the lure, for example caused by a fish having taken the lure and wanting to carry it away. The sensor emits a signal to an actuator which moves fishing hooks from a hidden and shielded position, substantially retracted into the lure or in recesses in the lure, into a projecting position in order thereby to penetrate into an adjacent portion of the fish which has taken the lure. The threshold level for triggering the actuator can preferably be adjusted by the user.

The hooks preferably do not have barbs and will thereby be able to penetrate further into the fish than prior-art fishing hooks. This may provide greater catching efficiency and will, at the same time, give less damage in the fish if it is to be released.

If a signal-transmitting, conductive fishing line is used, the hooking process can be activated and deactivated manually. The angler will then typically be able to choose which hooking system is to be used, that is to say manual control or the use of the built-in, sensor-controlled system, possibly a combination.

After a prescribed time (for example one hour) after the hooking process was activated, the built-in actuator will preferably be reversed, the hooks being retracted into the lure so that the fish is released. Such a property will reduce the risk of irremediable damage to the fish if the fishing line breaks or fishing is going on without the equipment being monitored.

A mechanism for hooking activation, including sensor(s) and actuator(s), switch(es) and so on, is arranged inside the body of the lure which will be covered by a flexible, outer layer which is typically called "skin". The skin creates the outer characteristics of the lure by its colour, structure and shape, and will give the angler the desired flexibility in his/her adaptation of the fishing equipment to the prevailing conditions. Preferably, the skin is of a kind that is easily perforated by the hooks as they are being pushed out. Thereby it is not necessary to form hook openings in the skin when it is being produced. In a preferred embodiment, the skin is replaceable.

Other functional features may also be incorporated in the fishing tool according to the invention, for example sound and/or light control, sonar, movement control and safety means.

The invention relates more specifically to a fish lure provided with one or more fishing hooks and an attachment for a fishing line, characterized by the fishing hook(s) being arranged in a body and being connected to an actuator, a hook-shaped end portion of the fishing hook(s) being arranged to be movable between a first position, substantially enveloped in the body, and a second position, projecting from the body.

The actuator may be provided with a control unit which is connected, in a control-signal-communicating manner, to a remote-control unit via the fishing line. Alternatively, the signal communication may be a wireless one. Thus, the activation of the actuator may be performed manually.

The actuator may be provided with a control unit which is connected to a load-sensing sensor arranged in connection with the fishing line. Thereby the activation of the actuator can happen automatically according to a preset triggering tensile force.

An energy accumulator may be connected to the actuator. The fish lure is thereby self-sufficient in energy.

The energy accumulator may be taken from the group consisting of an electrical accumulator and a gas accumulator.

A movement control unit may be arranged in the body. The fish lure may thereby imitate the motion pattern of a prey.

The movement control unit may include means arranged to shift the centre of gravity of the fish lure relative to the centre of buoyancy of the fish lure. The movement control unit may thereby be enclosed in the body.

The body may be provided with one or more means taken from the group consisting of a light source, a sound source, sonar, a thermometer and a data storage unit. The fish lure may thereby exhibit an improved imitation of the behaviour of a prey and also provide data on the fishing environment.

A signal-processing unit which is arranged to generate an acoustic or visual alarm signal via the remote-control unit whenever a received signal falls outside a predetermined limit value is connected to the body. The angler may thereby be warned of changes in the fishing environment.

The body may be enveloped in a replaceable skin formed as a prey. Thereby, the fish lure can easily be adapted for catching different species of fish.

At least a portion of the skin may be arranged to be penetrable by the hook-shaped end portion of the fishing hook. Thus, less precision is required in the production and fitting of the skin.

Extending from an opening in the skin, which is arranged to receive a fishing line attachment, there may be one or more areas of reduced tear strength. Thereby, the body may be pulled out of a skin that has got stuck in vegetation or other objects.

In what follows is described an example of a preferred embodiment which is visualized in the accompanying drawings, in which.

Figure 1:
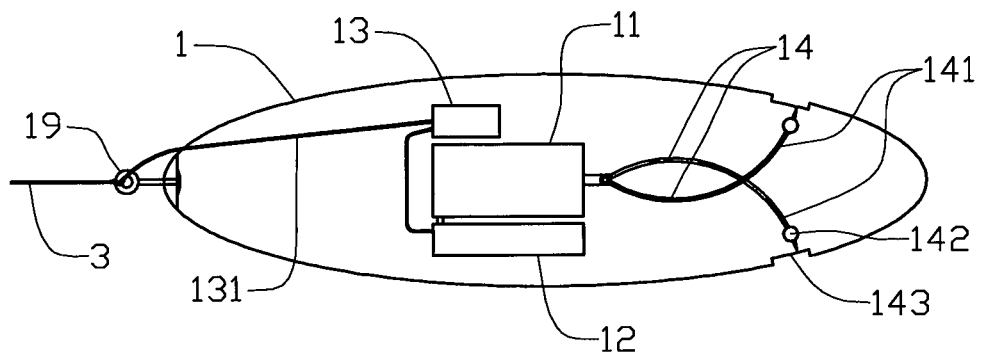
FIG. 1 shows, in a plan, a principle drawing of the interior of a body of a fish lure according to the invention, two fishing hooks being placed in a retracted position.
Figure 2:
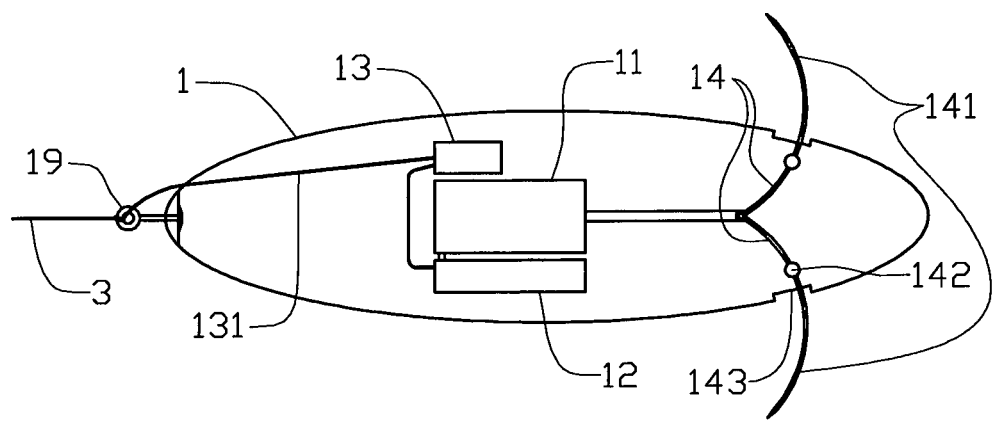
FIG. 2 shows the fishing hooks in an extended position.
Figure 3:
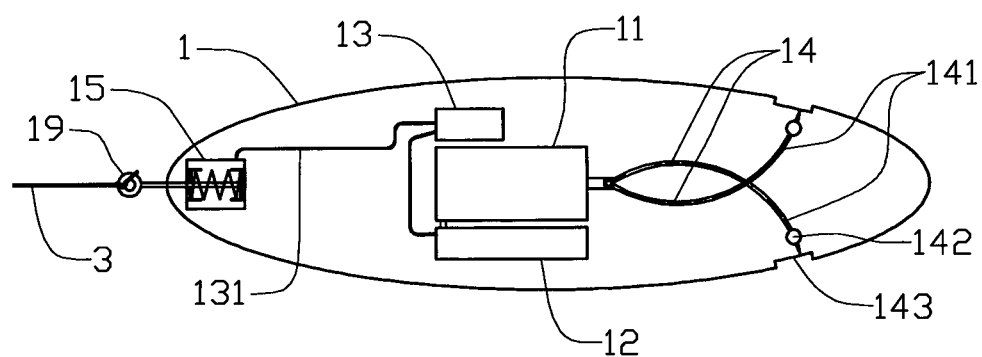
FIG. 3 shows an alternative embodiment in which a tension-sensing sensor is connected between a fishing line and an actuator control unit.

Reference is made first to FIGS. 1 and 2, in which the reference numeral 1 indicates a body of a fish lure. The body 1 is substantially formed as a rotary body of an elliptical shape, but other shapes are also relevant. The body 1 accommodates two movable fishing hooks 14 which are arranged to be moved by means of an associated actuator 11 from a first position, in which a hook-shaped end portion 141 of each of the fishing hooks 14 is fully retracted into the body 1 (see FIG. 1), and to a second position, in which the end portions 141 project from the body 1 in approximately opposite directions. In the exemplary embodiment shown, this has been provided by the fishing hooks 14 being pivotably attached to a movable end portion of a linear actuator 11 and passed through respective hook guides 142 and out through openings 143 in the body 1.

The actuator 11 is connected to an energy accumulator 12, for example an electric battery or a gas cartridge, which is connected to an actuator control unit 13 arranged to generate, on receipt of a signal, a displacement of the fishing hooks 14 by the actuator 11 being activated.

A skin 2 with the texture, colour and form of a prey attractive to a fish covers the body 1. At least at the fishing-hook openings 143 in the body 1, the skin 2 is arranged to be perforatable by the fishing hook 14, so that the fishing hook 14 is not obstructed in its movement out of the body 1. By means of openings (not shown) and possibly attachment means (not shown), the skin is preferably arranged to be completely or partially removed for access- to the contents of the body 1, possibly to be replaced.

Figure 6:
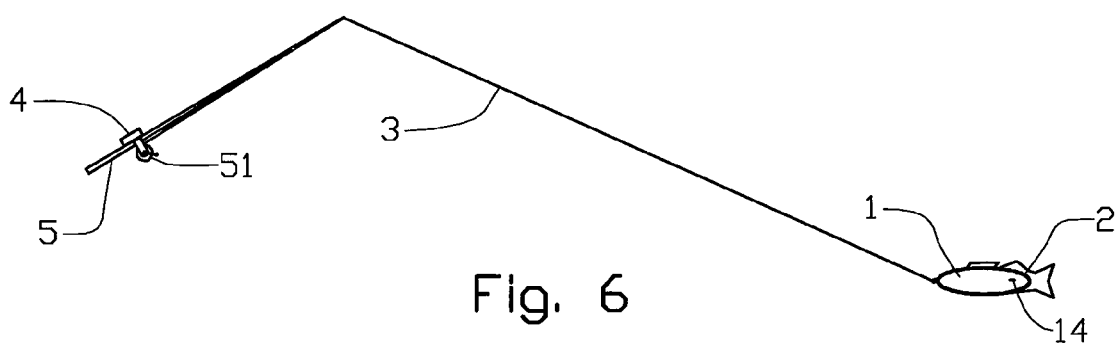
FIG. 6 shows, on a smaller scale, the fish lure connected to a fishing line which forms a control-signal-communicating connection to a remote-control unit.

A fishing line 3 is attached to a fishing-line attachment 19 arranged in a portion of the body 1. The fishing line 3 is connected, in a manner known per se, to a fishing tool, shown in FIG. 6 as a fishing rod 5 with an associated reel 51.

In one embodiment the fishing line 3 is conductive, that is to say it can carry signals between a remote-control unit 4 arranged remotely from the body 1, for example at the reel 51 on the fishing rod 5, and the actuator control unit 13. In such an embodiment, the fishing line 3 is conductively connected to a signal line 131 extending from the exterior of the body 1 to the actuator control unit 13. In this embodiment the actuator 11 can be activated manually by the angler.

In another embodiment the fishing line 3 is attached to a load-sensing sensor 15 arranged in the body 1. The sensor 15 is connected to the actuator control unit 13 via a signal line 131. In this embodiment, the actuator 11 can be activated automatically when the sensor 15 is subjected to a predetermined tensile force. It is obvious that the load-sensing sensor 15 may be adjusted to a desired tensile-force level by the angler, or that the body 1 comes in different tensile-force classes or the like.

It is obvious that the above-mentioned ways of activating the actuator 11 could also be combined, it being possible then to choose between different activation modes.

In yet another embodiment (see FIG. 4), the body is provided with a number of means arranged to improve the fishing properties of the fish lure, for example a light source 171 which affects the appearance of the fish lure, or a sound source 172 which is arranged to imitate the sound of the imitated prey. Other means that are shown are a sonar 173 which emits signals in several directions to record the distance to a seabed or other objects, a thermometer 174 registering the water temperature, a data storage unit 175 for recording relevant information from the surroundings of the fish lure, and also a signal-processing unit 18 arranged to generate an acoustic or visual alarm signal via the remote-control unit 4 whenever a received signal falls outside a predetermined limit value.

To reduce the risk of the body 1 being lost if the fish lure catches on vegetation or other objects in the water, the skin 2 is provided, in one embodiment, with weakened portions 22 extending from an opening 21 which is arranged for the fishing-line attachment 19 to be passed through. The weakening is typically provided by the skin material being thinner here than in other parts of the skin 2 enveloping the body 1.

Figure 4:
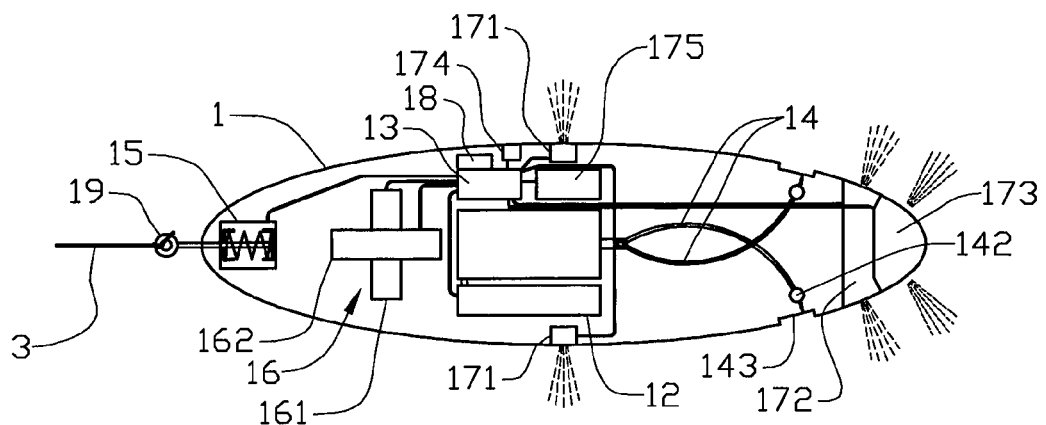
FIG. 4 shows an alternative embodiment in which the body is provided with a number of additional means.
Figure 5:
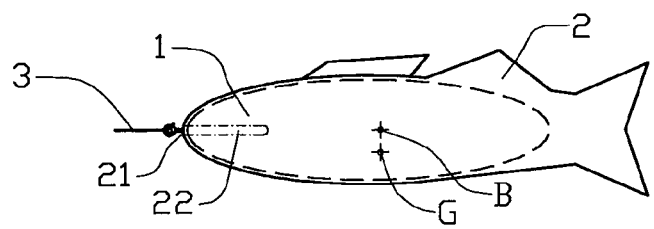
FIG. 5 shows, in a side view and on a smaller scale, the body arranged with a covering skin formed as a fish.

In one embodiment, the body 1 is provided with means arranged to affect the motion pattern of the fish lure, for example by an imitation fish body rotating around a longitudinal axis and/or around a transverse axis. In FIG. 4 this is indicated by a movement control unit 16 which is in signal communication with the actuator control unit 13. The movement control unit 16 includes means arranged to shift the centre of gravity G of the fish lure relative to the centre of buoyancy B of the fish lure in the form of a side-control unit 161 which is arranged to move a mass transversely to the longitudinal axis of the fish lure, and a vertical-control unit 162 which is arranged to move a mass in the longitudinal direction of the fish lure.

While the invention has been described with a certain degree of particularity, it is manifest that many changes may be made in the details of construction and the arrangement of components without departing from the spirit and scope of this disclosure. It is understood that the invention is not limited to the embodiments set forth herein for purposes of exemplification, but is limited only by the scope of the attached claims, including the full range of equivalency to which each element thereof is entitled.

The invention claimed is:

1. A fish lure, said lure comprising:
one or more fishing hooks (14) and an attachment for a fishing line (3), the fishing hook(s) (14) being arranged in a body (1) and being connected to an actuator (11), a hook-shaped end portion (141) of the fishing hook(s) (14) being arranged to be moved by the actuator from a first position, substantially enveloped in the body (1), to a second position, projecting from the body (1), and also arranged to be moved by the actuator from said second position back to said first position, wherein the actuator (11) is provided with a control unit (13) which is connected in a signal-communicating manner to a remote-control unit (4) operable by a user to selectively extend or retract the hook-shaped portion, said actuator being connected to an energy accumulator (12) taken from the group consisting of an electrical accumulator and a gas accumulator.

2. The fish lure in accordance with claim 1, wherein the control unit is in wireless signal communication with the remote-control unit (4).

3. The fish lure in accordance with claim 1, wherein the control unit (13) is further connected to a load-sensing sensor (15) arranged in connection with the fishing line (3), said load-sensing sensor being arranged to sense a fish strike and send a signal to the control unit to extend the hook-shaped portion.

4. The fish lure in accordance with claim 1, wherein a movement control unit (16) including means arranged to shift the center of gravity (G) of the fish lure relative to the center of buoyancy (B) of the fish lure is arranged in the body (1).

5. The fish lure in accordance with claim 1, wherein the body (1) is provided with one or more features taken from the group consisting of a light source (171), a sound source (172), a sonar (173), a thermometer (174) and a data-storage unit (175).

6. The fish lure in accordance with claim 1, further comprising sensors for detecting environmental conditions under the water, and a signal-processing unit (18) which is arranged to generate an acoustic or visual alarm signal via the remote-control unit (4) when a received signal related to such environmental conditions falls outside a predetermined limit value.

7. The fish lure in accordance with claim 1, wherein the body (1) is enveloped in a replaceable skin (2) shaped as a prey.

8. The fish lure in accordance with claim 7, wherein at least a portion of the skin (2) is arranged to be penetrable by the hook-shaped end portion (141) of the fishing hook (14).

9. The fish lure in accordance with claim 7, wherein extending from an opening (21) in the skin (2) arranged to receive a fishing-line attachment (19), there are one or more areas (22) of reduced tear strength.

10. The fish lure in accordance with claim 1, wherein the control unit signal communicates with the remote-control unit (4) via a signal-carrying fishing line.

\* \* \* \* \*